United States Patent
Kovermann et al.

(10) Patent No.: US 9,692,029 B2
(45) Date of Patent: Jun. 27, 2017

(54) CONNECTING PIECE FOR CONNECTING POLES OF TWO BATTERIES OR BATTERY CELLS AND PRODUCTION METHOD FOR A CONNECTING PIECE FOR CONNECTING POLES OF TWO BATTERIES OR BATTERY CELLS

(71) Applicant: KME Germany GmbH & Co. KG, Osnabrück (DE)

(72) Inventors: Marc Kovermann, Hagen a. T.W. (DE); Albert Rumbach, Aachen (DE)

(73) Assignee: KME GERMANY GMBH & CO. KG, Osnabrück (DE)

( * ) Notice: Subject to any disclaimer, the term of this patent is extended or adjusted under 35 U.S.C. 154(b) by 0 days.

(21) Appl. No.: 14/392,222

(22) PCT Filed: Jun. 2, 2014

(86) PCT No.: PCT/DE2014/000270
§ 371 (c)(1),
(2) Date: Dec. 24, 2015

(87) PCT Pub. No.: WO2014/206385
PCT Pub. Date: Dec. 31, 2014

(65) Prior Publication Data
US 2016/0293924 A1    Oct. 6, 2016

(30) Foreign Application Priority Data

Jun. 24, 2013  (DE) .......................... 10 2013 010 472

(51) Int. Cl.
*H01M 2/20*         (2006.01)
(52) U.S. Cl.
CPC ........... *H01M 2/206* (2013.01); *H01M 2/202* (2013.01); *H01M 2220/20* (2013.01)

(58) Field of Classification Search
CPC ... H01M 2/202; H01M 2/206; H01M 2220/20
See application file for complete search history.

(56) References Cited

U.S. PATENT DOCUMENTS

2013/0309919 A1   11/2013   Oda et al.

FOREIGN PATENT DOCUMENTS

DE   102007063177   6/2009
DE   102011080977   2/2013
(Continued)

OTHER PUBLICATIONS

International Search Report issued by the European Patent Office in International Application PCT/DE2014/000270 on Oct. 3, 2014.
(Continued)

*Primary Examiner* — Jeremiah Smith
(74) *Attorney, Agent, or Firm* — Henry M. Feiereisen LLC

(57) ABSTRACT

A connecting piece includes a stamped metal sheet for conductively connecting poles of two batteries or battery cells, which connecting piece has a main body with a recess, wherein at least one insert element is arranged in the inner region of at least one recess. Either the insert elements have a groove on the circumferential face thereof, said groove running at least in regions of the circumference, or the main body has a groove on the inner face of the at least one recess therein, said groove running at least in regions of the circumference. The respectively corresponding component has a projection which is generated by material displacement when the two or one of the two components are/is pressed and which engages in the groove in an interlocking manner, so that the main body and each insert element are connected to one another, in an interlocking manner at least in regions, along the circumference of the insert element.

6 Claims, 3 Drawing Sheets

(56) References Cited

FOREIGN PATENT DOCUMENTS

DE 102012101771 6/2013
JP 2010-225339 10/2010
WO WO 2012/065890 A1 5/2012
WO WO 2012/102160 8/2012

OTHER PUBLICATIONS

Chinese Search Report issued on Apr. 24, 2017 with respect to counterpart Chinese patent application 201480042363.X.
Translation of Chinese Search Report issued on Apr. 24, 2017 with respect to counterpart Chinese patent application 201480042363.X.

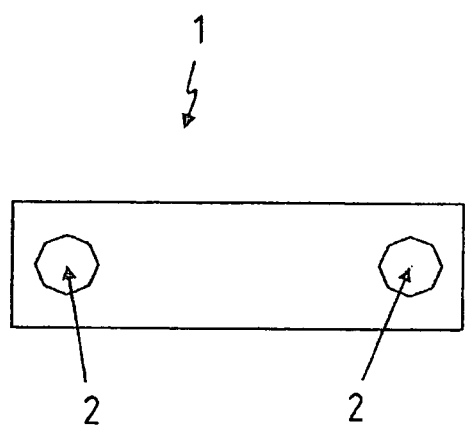
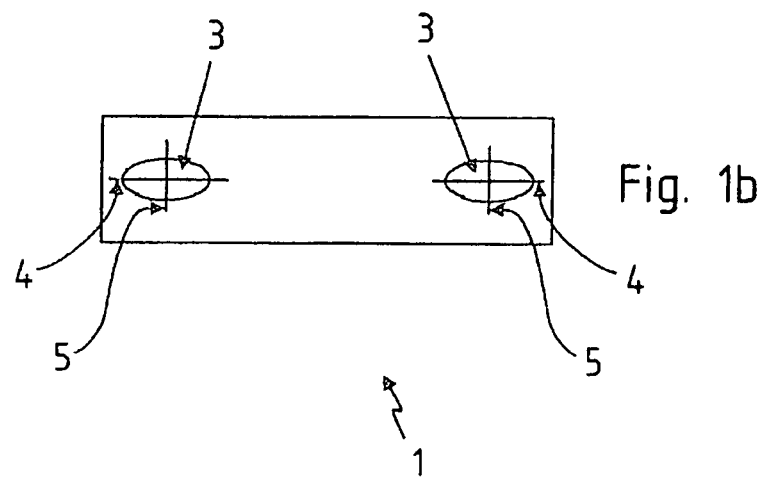
Fig. 1a
Fig. 1b

CONNECTING PIECE FOR CONNECTING POLES OF TWO BATTERIES OR BATTERY CELLS AND PRODUCTION METHOD FOR A CONNECTING PIECE FOR CONNECTING POLES OF TWO BATTERIES OR BATTERY CELLS

CROSS-REFERENCES TO RELATED APPLICATIONS

This application is the U.S. National Stage of International Application No. PCT/DE2014/000270, filed Jun. 2, 2014, which designated the United States and has been published as International Publication No. WO 2014/206385 and which claims the priority of German Patent Application, Serial No. 10 2013 010 472.6, filed Jun. 24, 2013, pursuant to 35 U.S.C. 119(a)-(d).

BACKGROUND OF THE INVENTION

The invention relates to a connecting piece for conductively connecting poles of two batteries or battery cells, which has a base body with at least one recess, wherein at least one insert element is arranged in the inner region of at least one recess. The application further relates to a production method for such a connecting piece Electrically driven motor vehicles have batteries, which are composed of individual battery cells. These are mostly lithium ion batteries, wherein the individual cells are formed by an anode and a cathode, which are respectively made of different materials. The individual cells are connected to each other in a serial connection in order to produce the required total voltage.

For this purpose the individual cells of a battery have to be connected to each other by way of connecting pieces. Hereby the respective anode of a cell and the cathode of the subsequent cell are connected with each other.

Anodes are often produced on the basis of an aluminum alloy, whereas cathodes are mostly based on a copper alloy.

The connecting pieces have to have a good electric conductivity, which makes copper a preferred manufacturing material. However, directly connecting a connecting piece made of copper with a battery contact made of aluminum poses the risk that in the presence of oxygen or humidity the contacting piece or the contact surface between the contacting peace and the battery contact corrodes and is thus destroyed.

This can be prevented by using identical materials at the contact site between the battery pole and the connecting piece (for example in each case aluminum). At the same time, however, the connecting piece has to possess the very good conductivity of copper.

Consequently, connecting pieces are known from the state-of-the-art who's connecting points are configured in correspondence with the material of the battery contact.

Thus for example from DE 10 2011 080 977 A1 a cell connector for electrically connecting terminals of battery cells is known, which is made of multiple material layers, wherein layers of a first material and a second material are alternately arranged. These materials can be copper and aluminum. The respective layers have two holes, wherein the holes in the copper layers are greater than the holes in the aluminum layers. These layers are arranged above each other so that smaller hole is arranged coaxial to the greater hole. As a result a connection site made of aluminum is formed in the inner region of the greater holes, so that when mounting the cell connector on the battery cells the aluminum poles can be connected with a contact region made of aluminum. In a vice versa arrangement also a connecting site for copper poles can be produced.

A disadvantage of such connecting pieces is on one hand the complex manufacturing, because a multitude of individual material layers has to be arranged precisely on top of each other. At the same time there is the risk of corrosion on between the individual material layers, which according to DE 10 2011 080 977 A1 is to be avoided by a plastic sealing. This sealing however represents an additional process step, which makes the production of such connecting pieces more complicated and more expensive.

A simplified manufacturing variant of a connecting piece for connecting two polls of cells of batteries is disclosed in DE 10 2007 063 177 A1. Here the connecting piece is made of a base body, which has two openings. In each of the two openings a sleeve-shaped compensation element is introduced, wherein the compensation element and the base body and the compensation element and the battery pole are connected to each other by a material-to-material connection.

Here, the production of the connection piece is strongly simplified, however, the welding connection of the inner sleeve made of aluminum or an aluminum alloy with a base body made of copper or a cooper alloy is difficult to produce. Nevertheless it is still required, however, to connect such a sleeve with the base body so that the sleeve is securely held in the base body.

SUMMARY OF THE INVENTION

It is an object of the connection to provide a connecting piece for conductively connecting battery poles of two batteries of battery cells, in which contact corrosion between the connecting piece and the assigned battery pole is prevented and which is easy to manufacture and also enables a stable connection of the batteries or battery cells.

It is another object of the invention to provide a manufacturing process for such a connecting piece.

The object relating to the devices is solved by a connecting piece according to the features of the instant invention.

The object relating to the process is solved by a production method described hereinbelow.

A connecting piece according to the invention made of a steel sheet for conductively connecting poles of two batteries or battery cells has a base body with at least one recess, wherein at least one insert element is arranged in the inner region of at least one recess. Either the insert elements have an at least partially circumferential groove on their circumferential side, or the base body has an at least partially circumferential groove on the inside of its at least one recess. The respective corresponding component has a protrusion, which is produced by a material displacement during pressing of both or one of the two components. The protrusion form fittingly engages into the groove so that at least regions of the base body and each insert element are form-fittingly connected along the circumference of the insert element.

The connecting piece serves for connecting poles of two batteries or battery cells. Hereby the batteries can be conventional batteries or battery cells or also rechargeable batteries or battery cells, which are often also referred to as accumulators. At the same time the batteries or battery cells can also be other types of energy storage devices, which are for example based on the principle of capacitors.

Generally the connecting pieces according to the invention are used in a battery of an electric-motor driven vehicle. This can be a purely electric motor vehicle as well as a full hybrid or plug-in hybrid vehicle. The individual battery cells of the entire battery are connected to each other in the form of a serial connection. This means that always the cathode of a battery cell is connected with the anode of a neighboring cell via the connecting piece.

The collecting piece according to the invention is preferably configured so that the contact region, in which the connecting piece is connected with the respective battery pole, is made of the material or material connection of which also the corresponding battery contact is made.

The connecting piece has a base body, which is provided with at least one recess. This at least one recess can for example be configured round, elliptical or as even or uneven polygon. Preferably the base body has two recesses, of which a respective one is connected with a battery pole of neighboring battery cells. However, it is also possible that only one recess is present, for example in the form of an oblong hole, which is then connected with both battery poles.

The recess does not necessarily have to be located exclusively in the inner region of the base body in the form of a hole. It can also be arranged in the border region of the base body in the form of an indentation, so that the shape of the recess is for example a semicircle, a semi ellipse, or a partial region of an even or even polygon.

In the inner region of at least one recess and insert element is arranged. This insert element forms a contact region between the connecting piece and the associated battery pole. The insert element can also be in contact over its full circumference with the base body. When the recess is round, elliptical or polygonal, the insert element has a correspondingly round, elliptical or polygonal outer circumference. Otherwise, for example when the recess has an oblong hole, the insert element may also be in contact with the base body with only a portion of its outer circumference. In the case of a recess in the shape of an oblong hole the insert element is only arranged at one end of the oblong hole. In this case, the insert element only contacts the base body at the end of the oblong hole, whereas the region of its circumference, which faces the center of the oblong hole, remains free.

In order to prevent that the insert element is unintentionally falling out of the recess, either the insert element has at least in regions on its circumference a circumferential groove. As an alternative also the base body can have a corresponding proof on the inside of its at least one recess. The respective corresponding component has a protrusion, which formfitting the pages in the groove. As a result an indentation is formed, which prevents that the insert element inadvertently falls out of the recess.

Depending on the configuration of the base body and its recesses, the form fit can be formed along the entire circumference of the insert element or also only in regions.

In this way a stable connection between the base body and the insert element is produced, whereby the connection between the individual batteries or battery cells is improved. After insertion of the insert element into the recess, the components are pressed together, preferably by exerting a pressure from above onto the common surface of the components. Hereby the pressure can either be exerted onto both components at the same time or onto the surface of only one component. As a result of the pressing, material of a body is displaced into the groove of the other body. This creates the protrusion which form fittingly engages into the groove.

The groove can for example have a semicircular, semi-elliptical, triangular or other polygonal cross-section so that a good material flow into the interior of the group is ensured.

The subsequent forming of the protrusion makes it possible to insert the insert elements into the recesses without problems. The production of the form fitting connection by the pressing can in addition be integrated into the production process without problems.

In a preferred embodiment of the invention, the insert element is made of a different material than the base body.

Here in particular the adjustability of the connecting piece to the anodes and cathodes of the battery cells, which are made respectively of different materials, plays a role. Preferably the contact sites of the connecting piece are made of the same or a similar material alloy as the battery contacts. This prevents contact corrosion between the connecting piece and the battery contact, and depending on the circumstances also enables a simpler connecting between the connecting piece and the battery contact.

The connecting piece and the battery contact can be connected with each other in a very simple manner by a screw connection. Hereby the connecting piece and the battery contact are simply pressed onto each other. However, it is also possible to create a welding connection, which can be realized even easier, when the components to be welded to each other a made of similar materials.

The connection of the base body and the insert element by form fit is also completely independent of the used materials. There are no difficulties regarding welding or similar material-to-material connections.

Pressing the two components with each other also generates a completely gas-tight form fit. Thus neither atmospheric oxygen nor humidity can reach the contact surface between the two components so that a corrosive destruction of the connection is prevented from the beginning.

In a further particular embodiment of the invention, the material of which the insert element is made has a greater coefficient of expansion than the material of which the base body is made.

This configuration has physical reasons. Battery cells in motor vehicles are subjected to fast charging and discharging cycles. Associated with this are always temperature changes of the battery cells and the connecting pieces, which leads to thermally related volume changes of the individual battery components and also of the components of the connecting piece. In order to prevent that due an uneven linear expansion of the individual materials the insert element slips out of the recess, the material of the insert element has preferably a greater coefficient of expansion than the material of the base body. This ensures that the insert element is securely held in the base body at all times.

In a preferred embodiment of the invention, the base body of the connecting piece is made of copper or a copper alloy, and the insert element is made of aluminum or an aluminum alloy or of steel, which is coated with aluminum or aluminum alloy.

This embodiment of the invention accounts for the circumstance that the battery poles are mostly made of copper or a copper alloy in case of the cathodes, whereas the anodes are mostly made of aluminum or aluminum alloy. The connecting pieces can thus be produced so as to be adjusted to the material composition of the battery contacts. As described above, this removes the risk of contact corrosion between the connecting piece and the battery contact and the connection capacity between the connecting piece and the battery contact is optimized.

In a further particular embodiment of the invention it is provided that the insert element is configured ring-shaped.

The outer circumference of the insert element is adjusted to the configuration of the recess in the base body. This means that the ring-shaped insert element can for example have a round, elliptical or polygonal outer circumference. The insert element is provided in its center with a hole, through which a screw or a threaded bolt can engage in order to create a connection to the battery contact. The size and shape of the hole is therefore adjusted to the screws or threaded bolts.

In particular insert elements that do not have a circular outer circumference, i.e., elliptical or polygonal insert elements, have the advantage that the insert element is held rotationally fixed in the correspondingly configured recess. Because the connecting pieces preferably is fastened with a screw or a threaded bolt on the battery contact, the insert element should not should not become loose when fastening the screw or a nut but should be securely seated in the recess so as to be protected against rotation.

Preferably the smallest extent of the insert element is greater than the greatest extent of the screw head or the nut so that a full surface contact of screw head and nut with the insert element is ensured.

In order to configure a circular insert element also rotation-resistant, the groove of the insert element or the base body is configured in a further embodiment of the invention so that its depth varies in different regions. During pressing of a connecting piece this accomplishes also a rotation-resistant formfitting connection. Also in the case of other circumferential geometries of the insert element the varying depth of the grooves leads to an additional protection against rotation.

In a further particular embodiment of the invention, the base body and the insert element have the same thickness and thus form a flush surface.

Preferably the base body and the insert elements have a thickness of 0.8 to 1.0 mm. Depending on the application, the components can also have a greater or smaller thickness, for example when greater or lower stiffnesses are required or when, due to use of particular material types, a greater or smaller thickness is required.

A flush surface has the advantage that during mounting of the connecting piece no thickness steps have to be taken into account. A corresponding configuration of the battery contacts is thus not required. In addition the insertion of the insert elements into the recesses of the base bodies is simplified because a corresponding positioning of the insert elements does not have to be taken into account.

Also the production of the connecting piece and the pressing of the components can be performed in a simpler tool, when the base body and insert element have a flush surface, because in this case a thickness does not have to be taken into account in the pressing tool.

In addition a flush surface is less prone to attachment of contaminants and humidity in the edges and to notch effects, which over time may compromise the stability of the connecting piece.

The production method for a connecting piece made of a sheet metal for conductively connecting of poles of two batteries or battery cells is characterized by the following method steps:
  providing a sheet metal blank and at least one insert element;
  punching at least one recess into the sheet metal blank;
  inserting at least one insert element into at least one recess;
  pressing the insert elements and the sheet metal blank so that between the outer circumference of the insert element and the inner circumference of the recess a form fitting connection is formed at least in regions;
  punching the outer contour of the base body of the connecting piece from the sheet metal blank;
  separating the connecting piece from the sheet metal blank.

The order of these method steps is not fixed by the listed sequence. The order of the individual punching steps can also be performed in the reverse order so that first the base body is punched out of a sheet metal blank and subsequently the recesses are punched into the base body.

In a particular embodiment of the invention, the at least one insert element is provided at least in regions with a groove along its outer circumference. During pressing, the material of the sheet metal blank flows into the groove for creating the formfitting connection.

The pressing is preferably performed so that pressure is exerted to the lower and/or the upper surface of either the sheet metal blank or the sheet metal blank and the insert element. As a result of this pressure the material of the sheet metal blank is displaced and flows into the proof of the insert element.

As a result the protrusion is created on the inside of the previously punched out recess, which protrusion engaged into the groove. As a result again a indentation is created which prevents that the insert element can slide out of the recess.

Instead of the pressing also stamping or any other method can be used by which the material flow can be realized.

It is also possible that pressing pressure is not exerted onto the top surfaces of the component but to the smaller side surfaces.

Analogously a further embodiment of the invention provides that after the punching of the at least one recess, at least one recess is provided along its inner circumference at least in regions with a groove and during the pressing the material of the insert element flows into the groove for creating a formfitting connection.

In this case, for creating a formfitting connection the same principle as described above is used with the difference that the groove and protrusion re formed on the respective other component. The pressing process is correspondingly adjusted. The method variants and advantages of the connection remained the same.

In a further embodiment of the invention, the connecting piece is further processed by methods such as bending, punching, cutting and the like.

By further processing steps the connecting piece can be tailored to the respective configuration of the battery contacts. For example a defined shape can be bent, and further connecting points can be attached or excess material can be removed.

The frequent charging and discharging processes so the battery or the battery cells leads to the fact that the batteries or battery cells, due to being heated during these processes, are subject to length and volume changes. This means their volume changes in dependence on the charge state and/or temperature. It is therefore advantageous when the connecting pieces are configured so that they are able to compensate these volume changes. This can for example be accomplished by introducing slots into the connecting piece or in that the connecting pieces are bent into a shape in which they are able to compensate these length fluctuations. For this purpose they are bent in one or multiple working steps, punched, cut or the like.

Particularly advantageous in the production method can be performed in a very simple manner in a composite follow-on tool. A very simple geometry of the base body can be brought into an individual shape by subsequent method steps such as bending, punching, cutting and the like.

In addition, inter alia due to the geometry of the connecting elements, no complex tools are required so that these can also be provided cost-effectively.

BRIEF DESCRIPTION OF THE DRAWING

In the following the invention is described in further detail by way of schematic drawings. Hereby all described and/or illustrated features individually or in meaningful combinations formed the subject matter of the present invention also independent of their combination in the claims or their dependencies.

It is shown in:

FIG. 1a a possible embodiment of the base body;

FIG. 1b a further possible embodiment of the base body;

DETAILED DESCRIPTION OF PREFERRED EMBODIMENTS

Figure 2A:
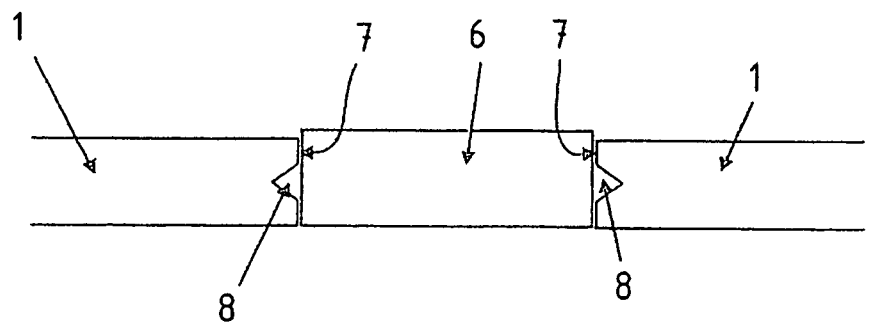
FIG. 2a a possible embodiment of a groove in the base body.

In the drawings, identical items are provided with the same reference numerals. FIGS. 1a and 1b respectively show a base body 1 of a connecting piece in a possible embodiment. In FIG. 1a the base body 1 has two recesses 2, which are respectively configured as an octagon.

The circumference of an associated insert element would in this case also be configured in the form of an octagon, wherein already as a result of the shape of the recesses and the insert elements a rotation protection for the insert element is ensured.

FIG. 1b shows a base body 1 with two elliptical recesses 3.

The associated insert element in this case also has an elliptical outer contour. An ellipsis is characterized by its main axis 4 and its minor axis 5. These two axes have different lengths, so that this geometric shape again impedes rotation of the insert element.

FIG. 2a shows the cross-section through a base body 1 in the region of a recess. Inserted into the recess is insert element 6, wherein the two components base body 1 and insert element 6 are not yet pressed with each other. The inner circumference 7 of the recess of the base body 1 is provided with a circumferential groove 8, which has a triangular cross-section.

In the un-pressed state, the insert element 6 has a greater thickness than the base body 1. Because preferably after the pressing the insert element 6 and the base body 1 have the same thickness, the material, which is to flow into the groove 8 during the pressing, has to be reserved in the thickness of the insert element 6.

Figure 2B:
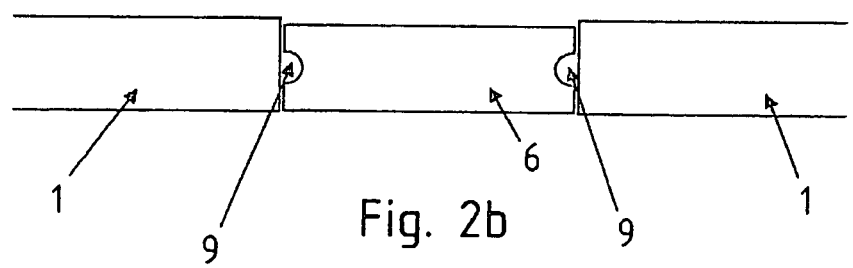
FIG. 2b a possible embodiment of the groove in the insert element.

The opposite configuration of the invention is shown in FIG. 2b. Here the insert element 6 is also inserted into a recess of the base element 1, wherein however a groove 9, which has a semicircular cross-section, is formed on the outer a circumference of the insert element 6.

Here the pressure onto the base element 1 causes material of the base element 1 to be displaced into the region of the groove 9, and thus forms an indentation, which securely holds the insert element 6 in the recess.

In this embodiment of the invention, the base element 1 has initially a greater thickness than the insert element, so that for accomplishing an identical thickness of the two components after the pressing, the material of the base body 1 required for the material flow, has to be reserved in its thickness.

Figure 3:
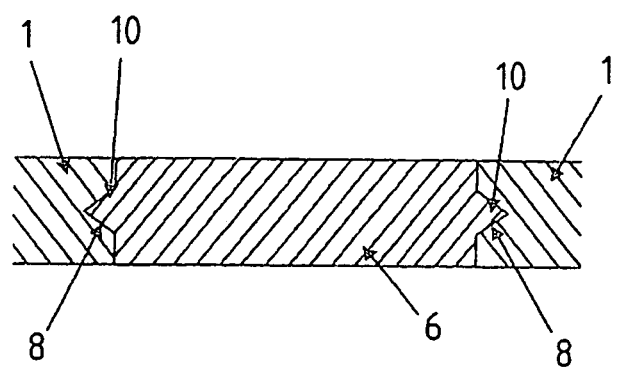
FIG. 3 the formfitting connection of and insert element.

FIG. 3 shows the embodiment of the connecting piece of FIG. 2a after the pressing process. Here it can be seen that the material of the insert element 6 has flown into the groove 8 of the base body 1, whereby a protrusion 10 is formed, which formfittingly engages into the groove 8.

The base body 1 and the insert element 6 are thus form-fittingly connected with each other so that the insert element 6 is securely held in the recess of the base body 1.

Due to the material flow, the thickness of the insert element has been reduced, so that the base body 1 and the insert element 6 have the same thickness and together form a flush surface.

The production of the connecting piece according to the invention can advantageously be performed in a composite follow-on tool. The individual process steps are illustrated in FIG. 4.

Figure 4:
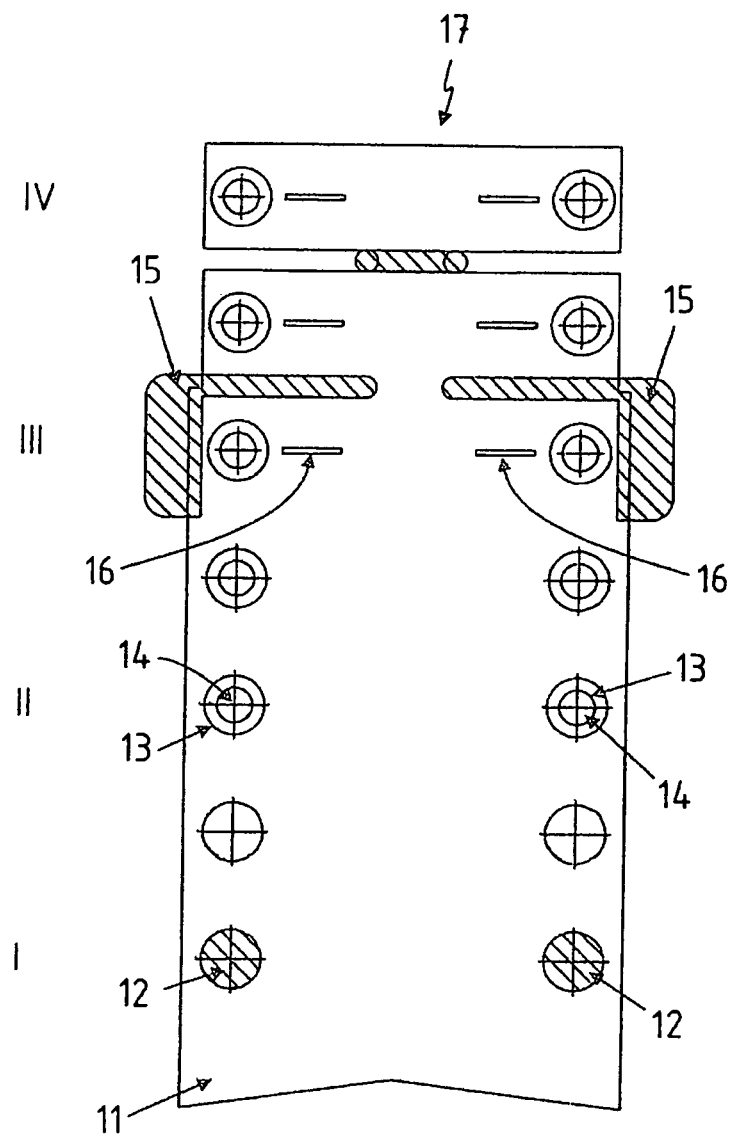
FIG. 4 the sequence of the steps in the production method.

Beside the method exemplary shown in FIG. 4, of course multiple combinations of the individual method steps are possible. The here shown embodiment is therefore representative for all other embodiments and combinations.

FIG. 4 shows a sheet metal blank 11, which is processed into a connecting piece according to the invention, in multiple subsequent processing steps I to IV. In this exemplary embodiment the sheet metal blank has a width, which approximately corresponds to the length of the later base body of the connecting piece.

The sheet metal blank can be uncoiled as endless sheet from a coil. However it can also be inserted into a composite follow-on tool in the form of cut to size sheet metal strips.

In step I, two recesses 12 are punched out of the sheet metal blank. The respective regions of the sheet metal blank, which are respectively punched out in a method step, are indicated hatched in FIG. 4.

In this exemplary embodiment the recesses 12 are configured circular. Next, in step II, insert elements 13 are inserted into both recesses. These insert elements have the shape of circular rings and are provided with a circumferential groove at their outer circumference. The hole 14 in the center serves for passing through screws or threaded bolts, in order to be able to establish a screw connection with the respective battery contacts. Also in step II the insert elements 13 and the sheet metal blank 11 are pressed with each other so that the material of the sheet metal blank 11 is displaced into the grroves of the insert elements 13 and thus a form fitting connection between the sheet metal blank 11 and the insert elements 13 is created. In step III the sheet metal blank 11 is cut (cutting region 15) so that the base body of the connecting piece obtains its outer geometry.

At the same time, in this exemplary embodiment also slots 16 are introduced, which serve for providing greater flexibility to the connecting piece.

In the last work step IV, the finished connecting piece 17 is separated from the sheet metal blank 11.

Optionally the connecting piece 17 can now be subjected to further processing steps such as bending, punching or cutting and the like if required for the construction.

REFERENCE SIGNS

1—base body
2—recess

3—recess
4—main axis
5—minor axis
6—insert element
7—circumference
8—groove
9—groove
10—protrusion
11—sheet metal blank
12—recess
13—insert element
14—hole
15—cutting region
16—slot
17—connecting piece

What is claimed is:

1. A connecting piece made of a punching sheet for conductively connecting poles of two batteries or battery cells, said connecting piece comprising:
at least one base body having at least one recess;
at least one insert element arranged in an inner region of the at least one recess,
wherein a groove is provided on one of the insert element and the base body, said groove provided on the insert element extending along at least a portion of a circumference of the insert element, said groove provided on the base body extending along at least a portion of a circumference of an inside of the at least one recess, wherein the other one of the insert element and the base body has a protrusion which is generated by a pressing of one or both of the insert element and the base body, said protrusion form fittingly engaging in the groove of the one of the insert element and the base body so that the base body and the insert element are form fittingly connected with each other at least in regions along the circumference of the insert element, and wherein the groove has a varying depth for inhibiting relative rotation between the insert element and the base body.

2. The connecting piece of claim 1, wherein the insert element is made of a different material than the base body.

3. The connecting piece of claim 2, wherein the material of the insert element has a greater coefficient of expansion than the material of the base body.

4. The connecting piece of claim 2, wherein the base body is made of copper or a copper alloy, and the insert element is made of aluminum or an aluminum alloy or of steel coated with aluminum or aluminum alloy.

5. The connecting piece of claim 1, wherein the insert element is ring-shaped.

6. The connecting piece of claim 1, wherein the base body and the insert element have a same thickness and together form a flush surface.

* * * * *